(12) United States Patent
Lipman (10) Patent No.: US 10,503,599 B2
(45) Date of Patent: Dec. 10, 2019

(54) METHOD AND SYSTEM FOR FACILITATING ONE-TO-MANY DATA TRANSMISSIONS WITH REDUCED NETWORK OVERHEAD

(71) Applicant: Intel Corporation, Santa Clara, CA (US)

(72) Inventor: Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/563,323

(22) Filed: Dec. 8, 2014

(65) Prior Publication Data

US 2015/0220399 A1    Aug. 6, 2015

Related U.S. Application Data

(63) Continuation of application No. 13/061,419, filed as application No. PCT/CN2009/001479 on Dec. 17, 2009, now Pat. No. 8,977,772.

(51) Int. Cl.
*G06F 11/14* (2006.01)
*H04L 1/08* (2006.01)
(Continued)

(52) U.S. Cl.
CPC ............ *G06F 11/1402* (2013.01); *H04L 1/08* (2013.01); *H04L 1/1628* (2013.01); *H04L 47/26* (2013.01);
(Continued)

(58) Field of Classification Search
CPC ...... G06F 11/1402; H04L 1/08; H04L 1/1628; H04L 47/26; H04L 47/15; H04L 47/28;
(Continued)

(56) References Cited

U.S. PATENT DOCUMENTS 6,807,578 B2   10/2004   Satran et al.
7,047,309 B2    5/2006   Baumann et al.
(Continued)

FOREIGN PATENT DOCUMENTS

CN   1499868       5/2004
CN   1529457 A    9/2004
(Continued)

OTHER PUBLICATIONS

International Search Report received for PCT Patent Application No. PCT/CN2009/001479, dated Sep. 9, 2010, 3 pages.
(Continued)

*Primary Examiner* — Esther B. Henderson
*Assistant Examiner* — Nazia Naoreen
(74) *Attorney, Agent, or Firm* — Barnes & Thornburg LLP (57) ABSTRACT

A method and system for facilitating one-to-many data transmissions with reduced network overhead includes conducting a round of data transmissions from a source computing device to a plurality of sink computing devices. Each of the sink computing devices generates a bucket list of lost data blocks for the round of data transmissions and transmits the bucket list to the source computing device. The source computing device conducts a subsequent round of data transmissions based on the bucket lists. One or more additional subsequent rounds may be conducted until the bucket list of each sink computing device is empty.

22 Claims, 8 Drawing Sheets

(51) Int. Cl.
*H04L 12/825* (2013.01)
*H04L 1/16* (2006.01)
H04L 12/801 (2013.01)
H04L 12/841 (2013.01)
H04L 1/00 (2006.01)

(52) U.S. Cl.
CPC .............. *H04L 47/15* (2013.01); *H04L 47/28* (2013.01); *H04L 47/29* (2013.01); *H04L 47/34* (2013.01); *H04L 2001/0093* (2013.01)

(58) Field of Classification Search
CPC .. H04L 47/29; H04L 47/34; H04L 2001/0093
USPC ........................................................ 709/232
See application file for complete search history.

(56) References Cited

U.S. PATENT DOCUMENTS

| | | | |
|---|---|---|---|
| 7,100,078 | B1 | 8/2006 | Pass |
| 7,536,622 | B2* | 5/2009 | Leon et al. .................. 714/748 |
| 7,636,767 | B2* | 12/2009 | Lev-Ran ............... H04L 12/583 709/218 |
| 8,018,933 | B2 | 9/2011 | Dickens et al. |
| 2002/0038441 | A1 | 3/2002 | Eguchi |
| 2004/0165596 | A1* | 8/2004 | Garcia .................. H04L 1/0003 370/395.21 |
| 2005/0182842 | A1 | 8/2005 | Walsh et al. |
| 2005/0182995 | A1 | 8/2005 | Curcio et al. |
| 2005/0216812 | A1 | 9/2005 | Leon et al. |
| 2005/0249231 | A1 | 11/2005 | Khan |
| 2006/0146822 | A1 | 7/2006 | Kolakowski et al. |
| 2006/0253601 | A1 | 11/2006 | Vedantham et al. |
| 2007/0115814 | A1* | 5/2007 | Gerla .................... H04L 1/0002 370/230 |
| 2008/0056263 | A1* | 3/2008 | Jain ........................ H04L 69/16 370/392 |
| 2008/0077710 | A1 | 3/2008 | Kouvelas et al. |
| 2012/0320732 | A1 | 12/2012 | Simu et al. |
| 2013/0007823 | A1* | 1/2013 | Mangs ................. H04L 1/0061 725/109 |

FOREIGN PATENT DOCUMENTS

| | | |
|---|---|---|
| CN | 1937553 A | 3/2007 |
| CN | 101127702 A | 2/2008 |
| JP | 2002064878 A | 2/2002 |
| JP | 2002124992 A | 4/2002 |
| JP | 2006060408 A | 3/2006 |
| JP | 2009515401 A | 4/2009 |
| KR | 10-2006-0120248 A | 11/2006 |
| KR | 10-2007-0010037 A | 1/2007 |
| WO | 2002058345 A2 | 7/2002 |
| WO | 2005104421 A1 | 11/2005 |
| WO | 2007052143 A2 | 5/2007 |
| WO | 2008029793 A1 | 3/2008 |
| WO | 2008106823 A1 | 9/2008 |
| WO | 2009037038 A2 | 3/2009 |

OTHER PUBLICATIONS

Office Action received for Korean Patent Application No. 10-2012-7012491, dated Oct. 15, 2013, 12 pages of Office Action including 6 pages of unofficial English translation.

Office Action received for Japanese Application No. 2012-541294, dated Apr. 30, 2014, 4 pages of Office Action including 2 pages of unofficial English translation.

Na et al., "Selective Multimedia Multicast Protocol in Wireless Personal Area Networks," Proceedings of the IEEE Wireless Communications and Networking Conference (WCNC 2007), Mar. 11-15, 2007, pp. 2287-2291.

Office Action received for Chinese Patent Application No. 200980162965.8, dated May 6, 2014, 15 pages of Office Action including 9 pages of unofficial English translation.

Office Action received for Japanese Application No. 2012-541294, dated Sep. 10, 2013, 4 pages of Office Action including 2 pages of unofficial English translation.

European Search Report for European Patent Application No. 09852160.2-1851/2514144 PCT/CN2009/001479, Aug. 27, 2014, 5 pages.

Office Action and Search Report received for Chinese Patent Application No. 200980162965.8, dated Dec. 1, 2014, 17 pages of Office Action including 11 pages of unofficial English translation.

Decision of Rejection received for Chinese Patent Application No. 200980162965.8, dated Jun. 3, 2016, 20 pages of Office Action including 12 pages of unofficial English translation.

Office Action received for Chinese Patent Application No. 200980162965.8, dated Jul. 3, 2015, 17 pages of Office Action including 10 pages of unofficial English translation.

Office Action received for Chinese Patent Application No. 200980162965.8, dated Dec. 25, 2015, 20 pages of Office Action including 12 pages of unofficial English translation.

Office Action for European Patent Application No. 09852160.2-1851, dated Sep. 30, 2016, 6 pages.

Rexamination decision in Chinese Patent Application 200980162965.8, dated May 26, 2017 (23 pages, including translation).

First Office Action in Chinese Patent Application 20161049107638, dated Sep. 5, 2018 (5 pages).

Second Office Action in Chinese Patent Application 20161049107638, dated Jun. 19, 2019, including machine translation (10 pages).

* cited by examiner

METHOD AND SYSTEM FOR FACILITATING ONE-TO-MANY DATA TRANSMISSIONS WITH REDUCED NETWORK OVERHEAD

CROSS-REFERENCE TO RELATED APPLICATIONS

The present application is a continuation application of U.S. application Ser. No. 13/061,419, entitled "Method and System for Facilitating One-to-Many Data Transmissions with Reduced Network Overhead," which was filed on Aug. 30, 2011 and which is a national stage entry under 35 USC § 371(b) of International Application No. PCT/CN2009/001479, which was filed on Sep. 17, 2009.

BACKGROUND

Collaboration computing environments often rely on data transfer from a source computing device to multiple destination or sink computing devices. For example, in educational environments, "classroom collaboration" relies on the transfer of files, video, and other data from the teacher's computing device to each student's computing device. Additionally, management of the sink computing devices (e.g., the student's computing devices) may require updates, new applications, or other management software or services be transmitted to each destination or sink computing device. Typically, multicast, broadcast, or other one-to-many data transmissions are used to effect such data transfer to the multiple sink computing devices.

Typical one-to-many data transmission technologies, such as multicasts and broadcasts, rely on acknowledgement feedback from each of the destination or sink computing devices. Such acknowledgments are often embodied as unicast data transmissions sent from each sink computing device to the source computing device to inform the source computing device that a data packet or block has been received without errors. As such, in networks including a large number of destination or sink computing devices (e.g., classroom collaboration environments may include sixty or more students), a large number of acknowledgement transmissions may be generated. The large number of individual unicast acknowledgement transmissions can cause network "implosion" if the destination computing devices attempt to transmit the acknowledgements near-simultaneously. Although some networks may include a "back-off" mechanism to prevent or reduce network implosion, such mechanisms can add further communication delay in the network. Additionally, the unicast communication technology used by the destination computers (e.g., User Datagram Protocol (UDP) or Transmission Control Protocol (TCP)), may require a further link layer acknowledgement from the source computing device. Such back and forth acknowledgements and network delays can occur contemporaneously with each other in the network, which tends to increase the overhead of the network.

BRIEF DESCRIPTION OF THE DRAWINGS

The systems, devices, and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Figure 1:
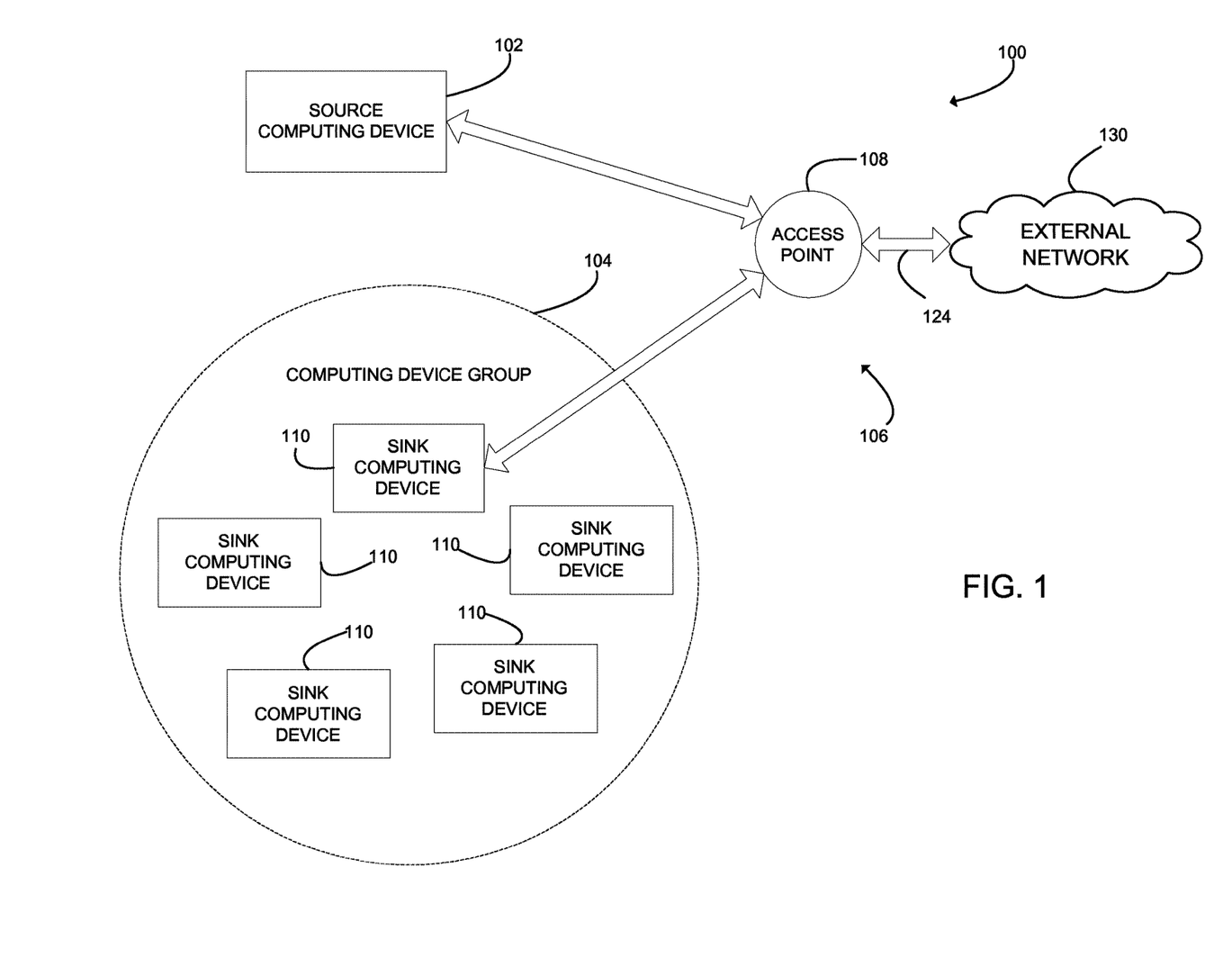
FIG. 1 is a simplified block diagram of one embodiment of a system for facilitating data transmissions to a one or more of computing devices with reduced network overhead.

Referring now to FIG. 1, a system 100 for facilitating data transmissions to a plurality of computing devices having reduced network overhead includes a source or server computing device 102 and a receiving or client computing device group 104. The computing devices 102, 104 are communicatively coupled to each other over a network 106 via an access point 108. The source computing device 102 may be embodied as any type of computing device capable of performing the functions described herein. For example, in some embodiments, the source computing device 102 may be embodied as a desktop computer, a laptop computer, a mobile internet device (MID), or other network-enabled computing device.

The computing device group 104 includes one or more destination or sink computing devices 110. Similar to the source computing device 102, each of the sink computing devices 110 may be embodied as any type of computing device capable of performing the functions described herein. For example, each of the sink computing devices 110 may be embodied as a desktop computer, a laptop computer, a mobile internet device (MID), or other network-enabled computing device.

The access point 108 facilitates communication between the computing devices 102, 110. The access point 108 may be embodied as any type of wired or wireless network communication routing devices such as a wired or wireless router, switch, hub, or other network communication device capable of communicatively coupling the computing devices 102, 110. In some embodiments, the access point 108 is also communicatively coupled to an external network 130 via a communication link 124. The network 130 may be embodied as any type of wired and/or wireless network such as a local area network, a wide area network, a publicly available global network (e.g., the Internet), or other network. Similarly, the communication link 124 may be embodied as any type of wired or wireless communication link capable of facilitating communication between the access point 108 and the external network 130 such as, for example, any number of wireless or physical connections, wires, cables, and/or other interconnecting links or paths. Additionally, the network 130 may include any number of additional devices, such as routers, switches, intervening computers, and the like, to facilitate communication between the computing devices 102, 110 and remote computing devices.

In some embodiments, the source computing device 102 and the computing device group 104 are located in a single room or are otherwise local to each other. For example, in one particular embodiment, the system 100 is incorporated in a classroom. In such embodiments, the source computing device 102 may be embodied as the teacher's or instructor's computing device and the sink computing devices 110 may be embodied as student computing devices. Of course, the system 100 may also be used in other environments or implementations in which one-to-many data transmissions are required.

In use, the source computing device 102 is configured to transmit data, such as files, video, images, text, and/or other data, to each of the sink computing devices 110 by conducting multiple rounds of data transmissions in which a plurality of data blocks is transmitted to the sink computing devices 110. During each round of data transmissions, the sink computing devices 110 record those data blocks that were not received or were received in a corrupted state as a bucket list of lost data blocks. After completion of each round of data transmissions, the sink computing devices 110 transmit their individual bucket list to the source computing device 102. In some embodiments, as discussed in more detail below, the sink computing devices 110 may transmit their bucket lists based on some criteria such as a delay period or the size of their respective bucket list (i.e., the number of data blocks in the bucket list). The source computing device 102 aggregates the bucket lists received from each sink computing device 110 and conducts a subsequent round of data transmissions in which the data blocks identified in the aggregated bucket list are retransmitted to the sink computing devices 110. One or more subsequent rounds may be conducted in this manner during which the sink computing devices 110 continue to report any lost data blocks to the source computing device 102 until the bucket list of each sink computing device 110 is empty.

In one particular embodiment, the sink computing devices 110 are configured not to send any acknowledgement transmission after receiving a data block from the source computing device 102. In such embodiments, the source computing device 102 is similarly configured not to wait for such acknowledgement transmissions from the computing devices 110 between transmissions of the data blocks. In this way, the amount of overall network traffic, and errors and delays resulting from such increased network traffic, may be reduced.

Figure 2:
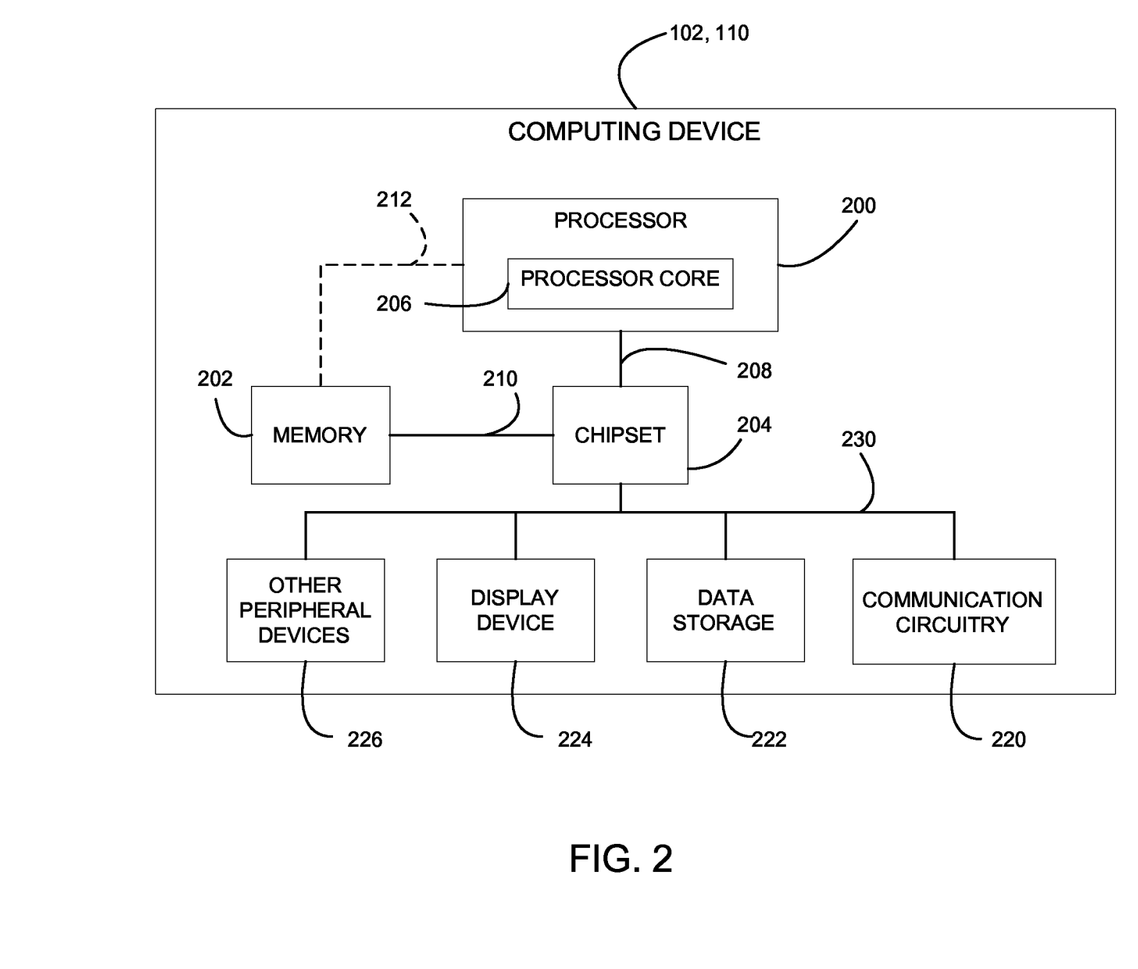
FIG. 2 is a simplified block diagram of one embodiment of a computing device of the system of FIG. 1.

Referring now to FIG. 2, in one embodiment, each of the computing devices 102, 110 includes a processor 200, a chipset 204, and memory 202. The computing devices 102, 110 may be embodied as any type of computing devices capable of performing the respective functions described herein. For example, as discussed above, the computing devices 102, 110 may be embodied as desktop computers, laptop computers, mobile internet devices (MID), or other network-enabled computing devices.

The processor 200 is illustratively embodied as a single core processor having a processor core 206. However, in other embodiments, the processor 200 may be embodied as a multi-core processor having multiple processor cores 206. Additionally, the computing devices 102, 110 may include additional processors 200 having one or more processor cores 206. The processor 200 is communicatively coupled to the chipset 204 via a number of signal paths 208. The signal paths 208 may be embodied as any type of signal paths capable of facilitating communication between the processor 200 and the chipset 204. For example, the signal paths 208 may be embodied as any number of bus paths, printed circuit board traces, wires, vias, intervening devices, and/or other interconnects.

The memory 202 may be embodied as one or more memory devices or data storage locations including, for example, dynamic random access memory devices (DRAM), synchronous dynamic random access memory devices (SDRAM), double-data rate dynamic random access memory device (DDR SDRAM), and/or other volatile memory devices. Additionally, although only a single memory device 202 is illustrated in FIG. 2, in other embodiments, the computing devices 102, 110 may include additional memory devices.

The chipset 204 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information. The chipset 204 is communicatively coupled to the memory 202 via a number of signal paths 210. Similar to the signal paths 208, the signal paths 210 may be embodied as any type of signal paths capable of facilitating communication between the chipset 204 and the memory device 202 such as, for example, any number of bus paths, printed circuit board traces, wires, vias, intervening devices, and/or other interconnects.

In other embodiments, the chipset 204 may be embodied as a platform controller hub (PCH). In such embodiments, the memory controller hub (MCH) may be incorporated in or otherwise associated with the processor 200. Additionally, in such embodiments, the memory device 202 may be communicatively coupled to the processor 200, rather than the chipset 204 (i.e., the platform controller hub), via a number of signal paths 212. Similar to the signal paths 208, the signal paths 212 may be embodied as any type of signal paths capable of facilitating communication between the memory device 202 and the processor 200 such as, for example, any number of bus paths, printed circuit board traces, wires, vias, intervening devices, and/or other interconnects.

The computing devices 102, 110 also include communication circuitry 220 for communicating with each other over the network 106. The communication circuitry 220 may be embodied as any number of devices and circuitry for enabling communications between the computing devices 102, 110. For example, the communication circuitry 220 may be embodied as one or more wired or wireless network interface cards (NICs) or other network communication cards, modules, or circuits for communicating with other computing devices 102, 110 via the access point 108.

The computing devices 102, 110 may also include additional peripheral devices such as a data storage 222, a display device 224, and other peripheral devices 226. Each of the communication circuitry 220, the data storage 222, the display device 224, and other peripheral devices 226 is communicatively coupled to the chipset 204 via signal paths 230. Again, similar to the signal paths 208, the signal paths 230 may be embodied as any type of signal paths capable of facilitating communication between the chipset 204 and the communication circuitry 220, the data storage 222, the display device 224, and other peripheral devices 226 such as, for example, any number of bus paths, printed circuit board traces, wires, vias, intervening devices, and/or other interconnects.

The data storage device(s) 222 may be embodied as any type of device configured for the short-term or long-term storage data such as, for example, memory devices and circuits, memory cards, hard disk drives, solid-state drives, or other data storage devices. The display device 224 may be embodied as any type of display device for displaying data to a user of the computing devices 102, 110 such as, for example, a liquid crystal display (LCD), a cathode-ray tube (CRT) display, a light emitting diode (LCD) display, or other display devices. The peripheral devices 226 may include any number of additional peripheral devices including input devices, output devices, and other interface devices. For example, the peripheral devices 226 may include a keyboard and/or mouse for supplying an input to the computing device 102, 110. The particular number and type of devices included in the peripheral devices 226 may depend upon, for example, the intended use of the computing device 102, 110.

Figure 3:
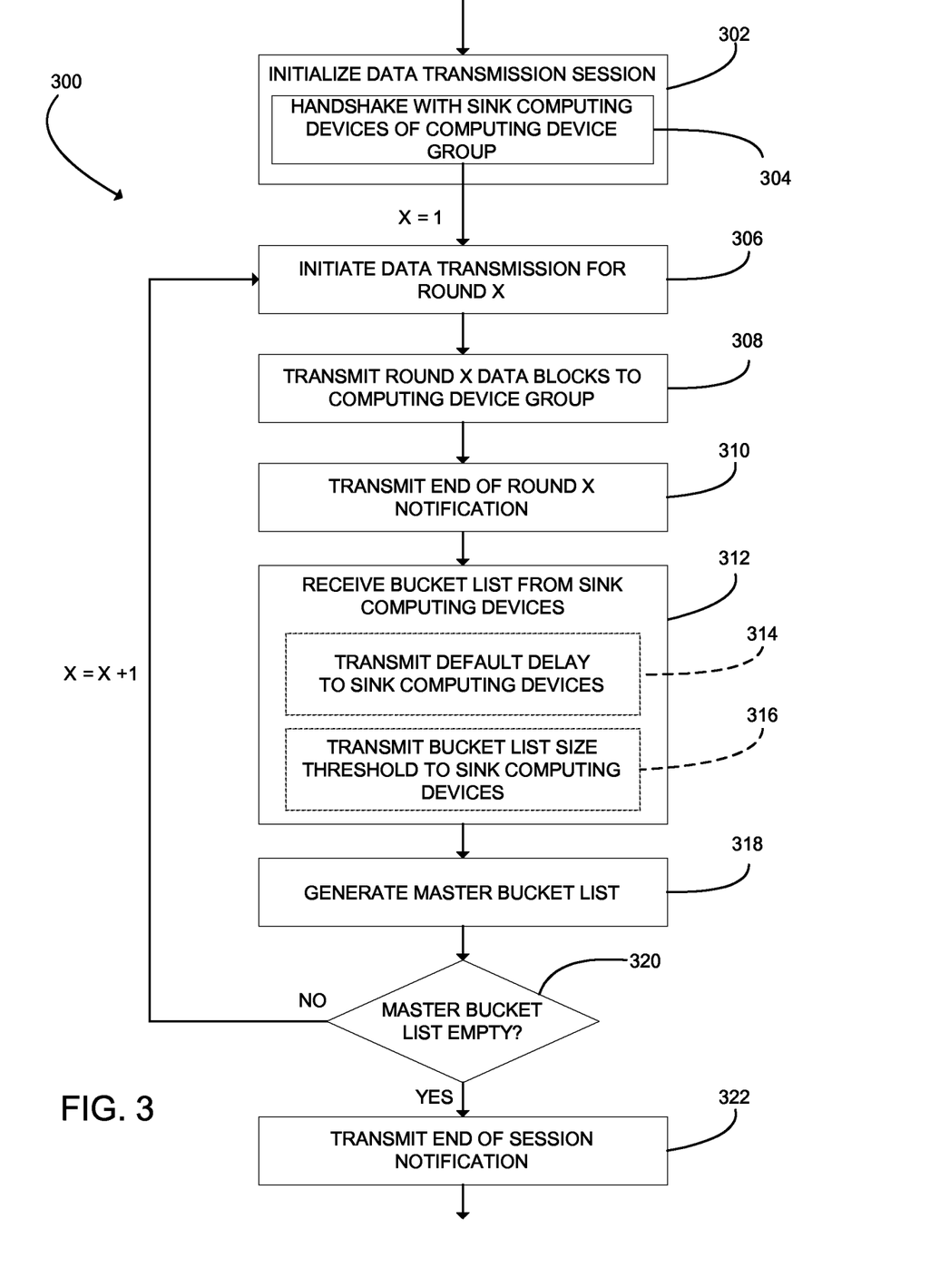
FIG. 3 is a simplified flow diagram of one embodiment of a method for transmitting data to the plurality of computing devices executed by the source computing device of the system of FIG. 1.

Referring now to FIG. 3, a method 300 for transmitting data to the plurality of computing devices 110 begins with block 302 in which the source computing device 102 initializes a session of data transmissions. During block 302, the source computing device 102 may perform any number of calibration and initialization procedures. Additionally, in some embodiments, the source computing device 102 handshakes with each of the sink computing devices 110 in block 304. Such handshaking may establish the communication protocols that will be used to transmit data to the sink computing devices 110 and/or other information or data to prepare the sink computing devices 110 to receive the data transmissions. For example, in one embodiment, the source computing device 102 informs the sink computing devices 110 about the data file that will be transmitted to the devices 110. Such information (e.g., the number of data blocks that the sink computing devices 110 should expect to receive) may be used by the sink computing devices 110 to determine lost data blocks (i.e., data blocks that were not received or were received in a corrupted state).

As discussed above, the source computing device 102 is configured to transfer the data file or other data to the sink computing devices 110 via use of one or more rounds of data transmissions. Those data transmission rounds subsequent to the first round are based on feedback from the sink computing devices 110. The source computing device 102 may conduct as many rounds of data transmissions as required to transfer successfully the data file or other data to the sink computing devices 110. Accordingly, in block 306, the source computing device initiates the next round of data transmissions. For example, during the first iteration of the method 300, the source computing device 102 initiates the first round (i.e., X=1) of data transmissions to the sink computing devices 110. In block 306, the source computing device 102 may transmit, for example, a notification to the sink computing devices 110 that the current round of data transmissions is beginning. In some embodiments, the source computing device 102 may also transmit data regarding the particular round of data transmissions, such as the number of data blocks to expect, to the sink computing devices 110 such that the devices 110 may determine whether any data blocks have been lost.

After the source computing device 102 has initiated the current round of data transmissions, the source computing device 102 transmits the data blocks for the current round of data transmission to the sink computing devices 110 in block 308. In the first round of data transmission, every data block comprising the data file or other data to be sent to the sink computing devices 110 is transmitted to the devices 110. However, as discussed in more detail below, only those data blocks identified as being lost by one or more sink computing devices are transmitted in subsequent rounds of data transmission. As such, any number of data blocks may be transmitted in block 308 depending on, for example, the size of the data file to be transmitted, previous rounds of data transmissions, feedback from the sink computing devices 110 as discussed below in more detail, and/or other criteria.

The source computing device 102 may use any suitable network communication technology to transfer the data blocks to the sink computing devices 110. For example, in some embodiments, the source computing device 102 may use multicast data transmissions or broadcast data transmissions to transfer the data blocks to the sink computing devices 110. Alternatively, in one particular embodiment, the source computing device 102 is configured to use the one-to-many data transmission described in U.S. patent application Ser. No. 13/061,429, entitled "METHOD AND SYSTEM FOR FACILITATING ONE-TO-MANY DATA TRANSMISSION TO A PLURALITY OF COMPUTING DEVICES" by Justin Lipman, which was filed on Aug. 30, 2011. In such embodiments, the source computing device 102 is configured to select one of the computing devices 110 as a "sink" computing device. The remaining computing devices 110 are configured in a promiscuous communication mode. The source computing device 102 transfers the data blocks to the selected sink computing device 110 by transmitting a unicast data transmission to the selected sink computing device 110. However, although the unicast data transmission is addressed to the selected sink computing device 110, the unicast data transmission is also received by each of the other non-selected computing devices 110. Because the non-selected computing devices 110 are configured in a promiscuous communication mode, the non-selected computing devices 110 also filter and process the unicast data transmission. In this way, a one-to-many data transmission is effected using a unicast data transmission.

After the source computing device 102 has transferred the data blocks for the current round of data transmissions, the source computing device 102 transmits a notification to each sink computing device 110 informing the devices 110 that the current round of data transmissions has completed (block 310). Subsequently, in block 312, the source computing device 102 receives any bucket lists transmitted by the sink computing devices 110. As discussed in more detail below, the bucket lists identify those data blocks from the current round that were lost by each reporting sink computing device 110.

Whether a particular sink computing device 110 transmits a bucket list to the source computing device 102 in block 312 is determined based on one or more criteria. For example, in one embodiment, every sink computing device 110 having at least one lost data block in its respective bucket lists transmits the bucket list to the source computing device in block 312 upon or after receiving the notification that the current round has ended. However, in other embodiments, the sink computing devices 110 may be configured to transmit their respective bucket lists based on a delay period after receiving the notification that the current round has ended. In such embodiments, the source computing device 102 is configured to transmit a default delay value to each sink computing devices 110 in block 314. The sink computing devices 110 determine their respective delay period after the end-of-round notification based on the default delay value as discussed in more detail below. Alternatively or additionally, in other embodiments, the sink computing devices 110 may be configured to transmit their bucket lists based on the size the respective bucket lists. In such embodiments, the source computing device 102 is configured to transmit a predetermined bucket list size threshold value to each sink computing device 110 in block 316. The sink computing devices 110 determine whether to transmit their bucket list based on the threshold value as discussed in more detail below.

After the source computing device 102 receives the bucket lists for the current round from the sink computing devices 110, the source computing device 102 aggregates the bucket lists to generate a master bucket list in block 318. The master bucket list includes indicia or identification of each data block that was reported by one or more sink computing devices 110 as being lost during that round of data transmission. If the master bucket list is determined to be empty in block 320 (i.e., no sink computing device 110 sent a bucket list having at least one data block), the source computing device 102 transmits a notification to each sink computing device 110 that the data transmission session has completed in block 322.

It should be appreciated, however, that in embodiments in which the source computing device 102 transmits a bucket list size threshold value to the sink computing devices 110 in block 316, the source computing device 102 may be configured to reduce the threshold value by a predetermined amount and retransmit the threshold value to the sink computing devices 110 if no bucket list is received from the sink computing devices 110. In this way, the source computing device 102 may continue reducing the threshold value each round until the threshold value is equal to zero.

Referring back to block 320, if the master bucket list is not empty, the method 300 loops back to block 306 in which the next round of data transmissions is initiated. In the next round, the data blocks identified in the master bucket list are retransmitted to the sink computing devices 110 as discussed above. In this way, the source computing device 102 conducts one or more rounds of data transmissions to transmit the data file or other data to the sink computing devices 110. Generally, each successive round of data transmission will include a smaller number of data blocks to be retransmitted by the source computing device 102.

Figure 4:
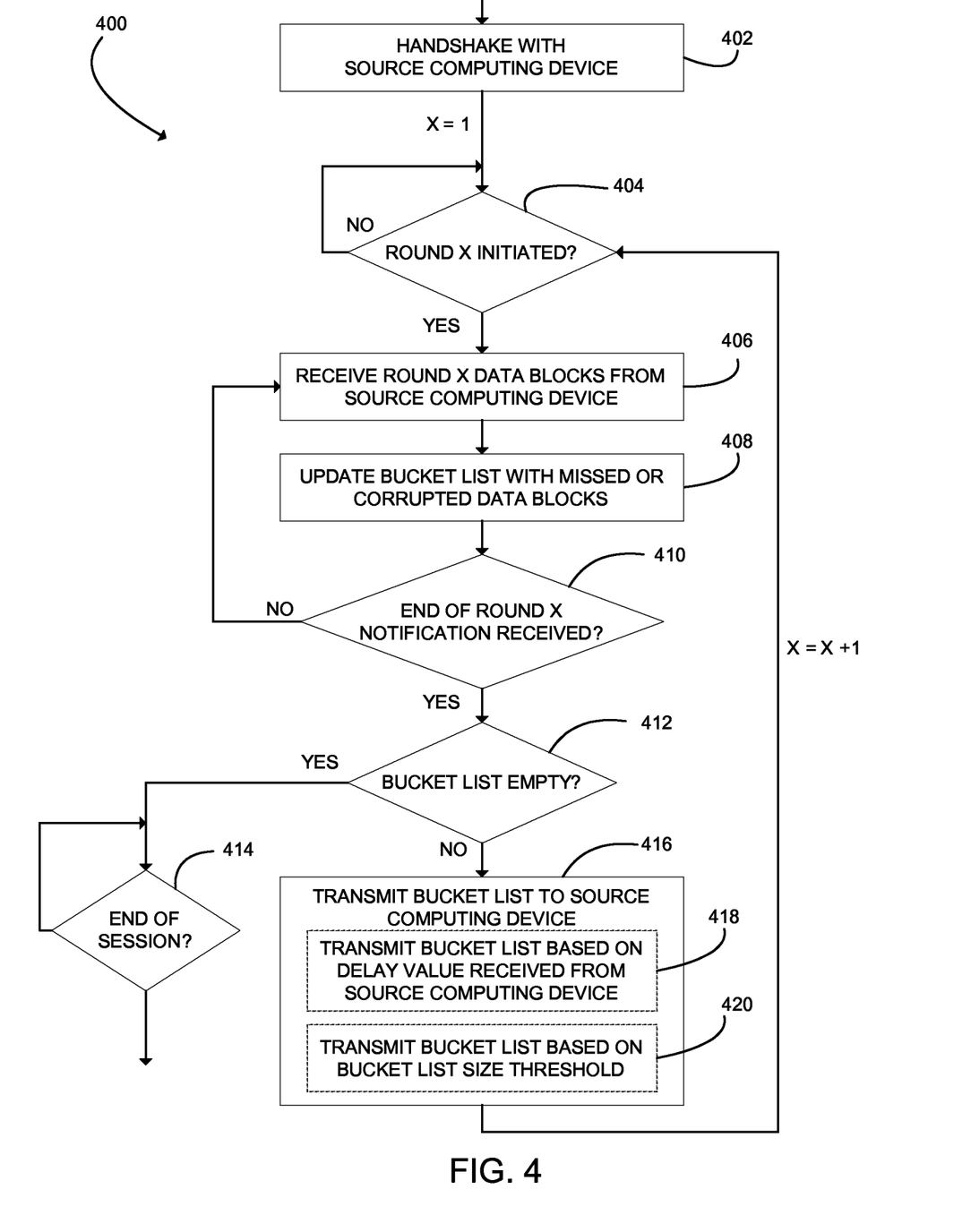
FIG. 4 is a simplified flow diagram of one embodiment of a method for receiving data from the source computing device executed by the plurality of computing devices of the system of FIG. 1.

Referring now to FIG. 4, a method for receiving data from the source computing device 102 begins with block 402 in which each sink computing device 110 handshakes with the source computing device 102. In block 402, the computing devices 102, 110 may establish the communication protocols that will be used to transmit data to the sink computing devices 110 and/or other information or data to prepare the sink computing devices 110 to receive the data transmissions as discussed above. For example, in some embodiments, the sink computing devices 110 may receive information about the data file that will be transmitted by the source computing device 102 such as, for example, the number of data blocks that should be received by each sink computing device 110.

In block 404, the sink computing device determines whether the current round of data transmissions has begun. As discussed above in regard to method 300, the source computing device 102 may transmit a notification and/or other data to the sink computers 110 indicating the beginning of a round of data transmissions and, in some embodiments, data regarding the current round of data transmissions such as, for example, the number of data blocks that will be transmitted in that round.

The plurality of sink computing devices 110 receive the data blocks transmitted by the source computing device 102 in block 406 and update their respective bucket lists of lost data blocks in block 408. Each sink computing device 110 is configured to generate and/or update a list of data blocks, or indicia thereof, that were transmitted by the source computing device 102 during the current round but were not received by the sink computing device 110 or were received in a corrupted state and, as such, must be retransmitted to the sink computing device 110. The sink computing devices 110 may store the bucket list in their respective memory 202 and/or data storage 222. The individual bucket lists may be diverse from each other and may contain no, one, or more data blocks based on the current round of data transmissions. The particular data stored in the data blocks to indicate those data blocks that were lost may vary depending on the particular embodiment and implementation. For example, in one embodiment, the sink computing devices 110 are configured to store the packet identification number of each data block determined to be lost for the current round.

In block 410, the sink computing devices 110 determine whether the round has completed. If not, the method 400 loops back to blocks 406 and 408 in which each sink computing device 110 continues to receive, or otherwise waits to receive, data blocks from the source computing device 102 and updates its bucket list of lost data blocks accordingly. However, if the sink computing devices 110 receive an end-of-round notification from the source computing device 102, the method 400 advances to block 412 in which each sink computing devices 110 determines whether its bucket list is empty (i.e., it has received every data block for the current data transmission session). If so, the particular sink computing device 110 waits for an end-of-session notification from the source computing device 102 in block 414. However, if a sink computing device 110 has at least one lost data block identified in its bucket list of lost data blocks, the method 400 advances to block 416 wherein the sink computing device 110 is configured to transmit its bucket list of lost data blocks to the source computing device based on particular criteria.

Figure 5:
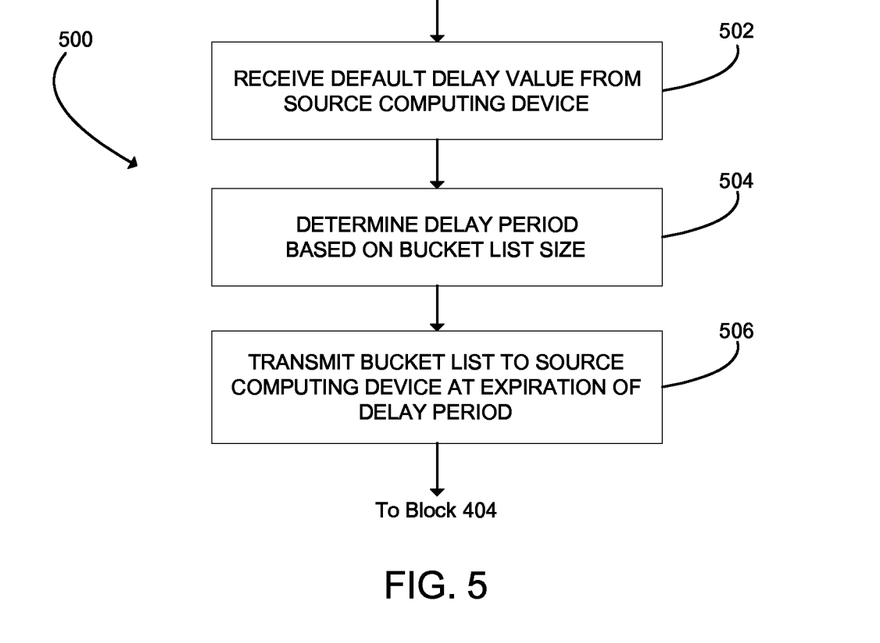
FIG. 5 is a simplified flow diagram of one embodiment of a method for transmitting a bucket list to the source computing device.

As discussed above, in some embodiments, the sink computing device 110 may be configured to transmit the bucket list upon, or after, receiving the end-of-round notification from the source computing device 102. However, in other embodiments, the sink computing device 110 may be configured to transmit the bucket list of lost data blocks based on a default delay value in block 418. To do so, the sink computing device 110 may execute a method 500 for transmitting the bucket list as illustrated in FIG. 5. The method 500 begins with block 502 in which the sink computing device 110 receives a default delay value from the source computing device 102. The default delay value defines a default time period after the completion of the current round (e.g., after receiving the end-of-round notification) after which the sink computing device 110 is to transmit its respective bucket list. The default delay value may be embodied as a number of microseconds, seconds, minutes, or other measurement of time. In block 504, the sink computing device 110 determines its particular delay period based on the size of its particular bucket list. For example, in one particular embodiment, the delay period for each sink computing device 110 is calculated by dividing the default delay value by the size of the respective bucket list (e.g., the number of data blocks identified in its bucket list). The sink computing device 110 subsequently transmits its respective bucket list at, or after, the expiration of the calculated delay period. In this way, sink computing devices having larger bucket lists transmit their bucket lists prior to those sink computing devices having smaller bucket lists. Additionally, by spreading out the transmission periods of the sink computing devices 110, the likelihood of network "implosion" and overall delay may be reduced.

Figure 6:
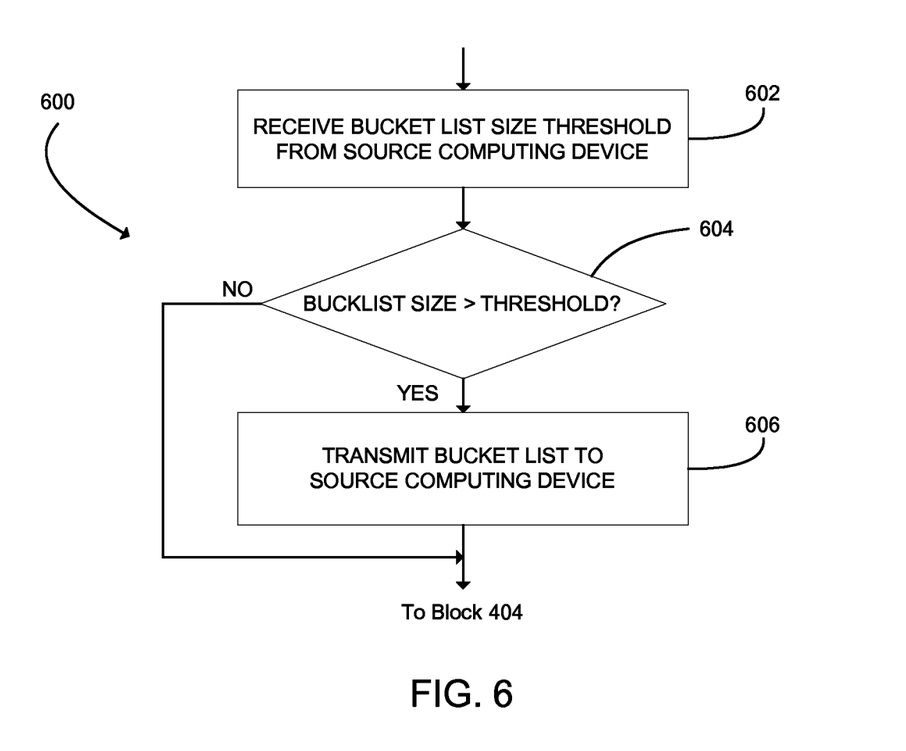
FIG. 6 is a simplified flow diagram of another embodiment of a method for transmitting a bucket list to the source computing device.

Referring back to block 416 of the method 400, in other embodiments, the sink computing device may be configured to transmit its particular bucket list based on the size of the bucket list in block 420. To do so, the sink computing device 110 may execute a method 600 for transmitting the bucket list as illustrated in FIG. 6. The method 600 begins with block 602 in which the sink computing device 110 receives a predetermined bucket list size threshold value. As discussed above, the predetermined threshold value may define a minimum number of data blocks. In block 604, the sink computing device 110 determines whether its particular bucket list has a predetermined relationship to the threshold value. For example, in the illustrative embodiment of FIG. 6, the sink computing device 110 determines whether its particular bucket list is larger than the threshold value. However, in other embodiments, the sink computing device 110 may be configured to determine whether its particular bucket list is equal to the threshold value or is less than the threshold value in block 604. In the illustrative embodiment, if the bucket list size of the sink computing device 110 is greater than the threshold value, the sink computing device 110 transmits its bucket list to the source computing device 102 in block 606. However, if the bucket list of the sink computing device 110 is not greater than the threshold value, the sink computing device 110 does not transmit its bucket list for the current round. Rather, the sink computing device 110 retains the identified lost data blocks in its bucket list and updates it accordingly during the next round of data transmissions. In this way, only those sink computing device 110 having bucket lists larger than the threshold value transmit their respective bucket lists. Accordingly, the transmission of bucket lists by the sink computing devices 110 is spread out or otherwise reduced each round, which may reduce the likelihood of network "implosion" and overall delay.

Figure 7:
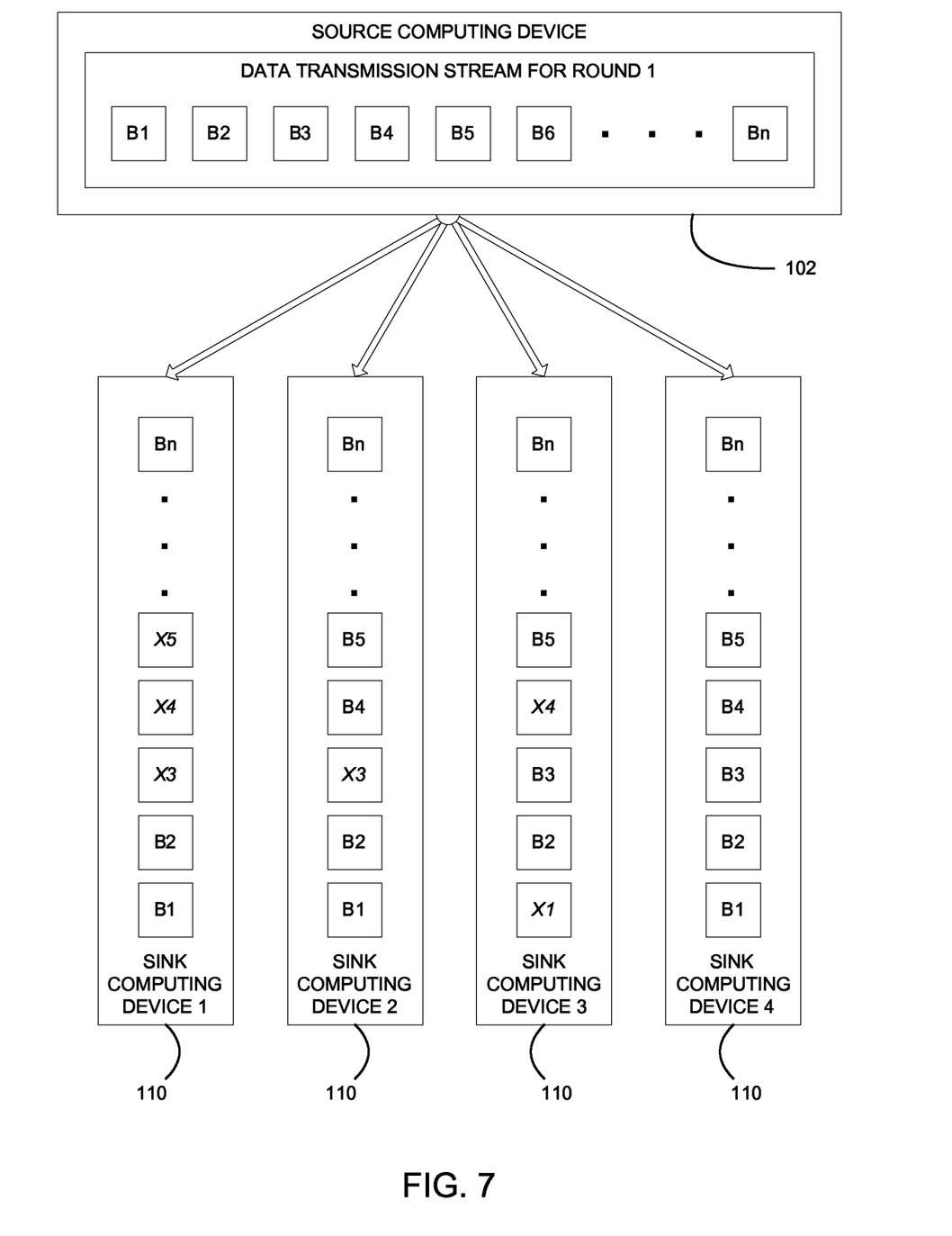
FIG. 7 is a simplified diagram illustrating a first round of data transmission to the plurality of computing devices during the method of FIG. 5.
Figure 8:
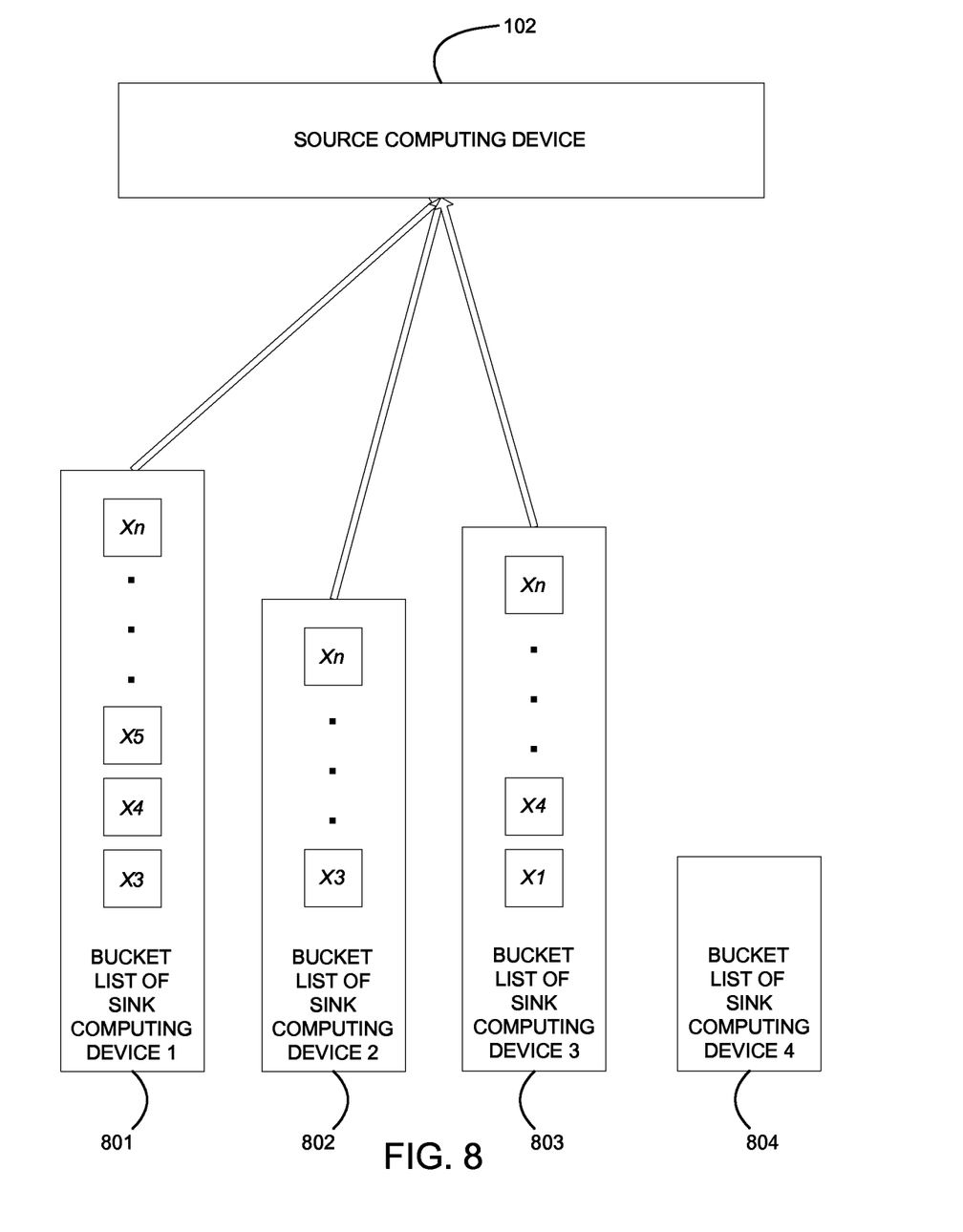
FIG. 8 is a simplified diagram illustrating the bucket list of the plurality computing devices after the data transmission illustrated in FIG. 7.
Figure 9:
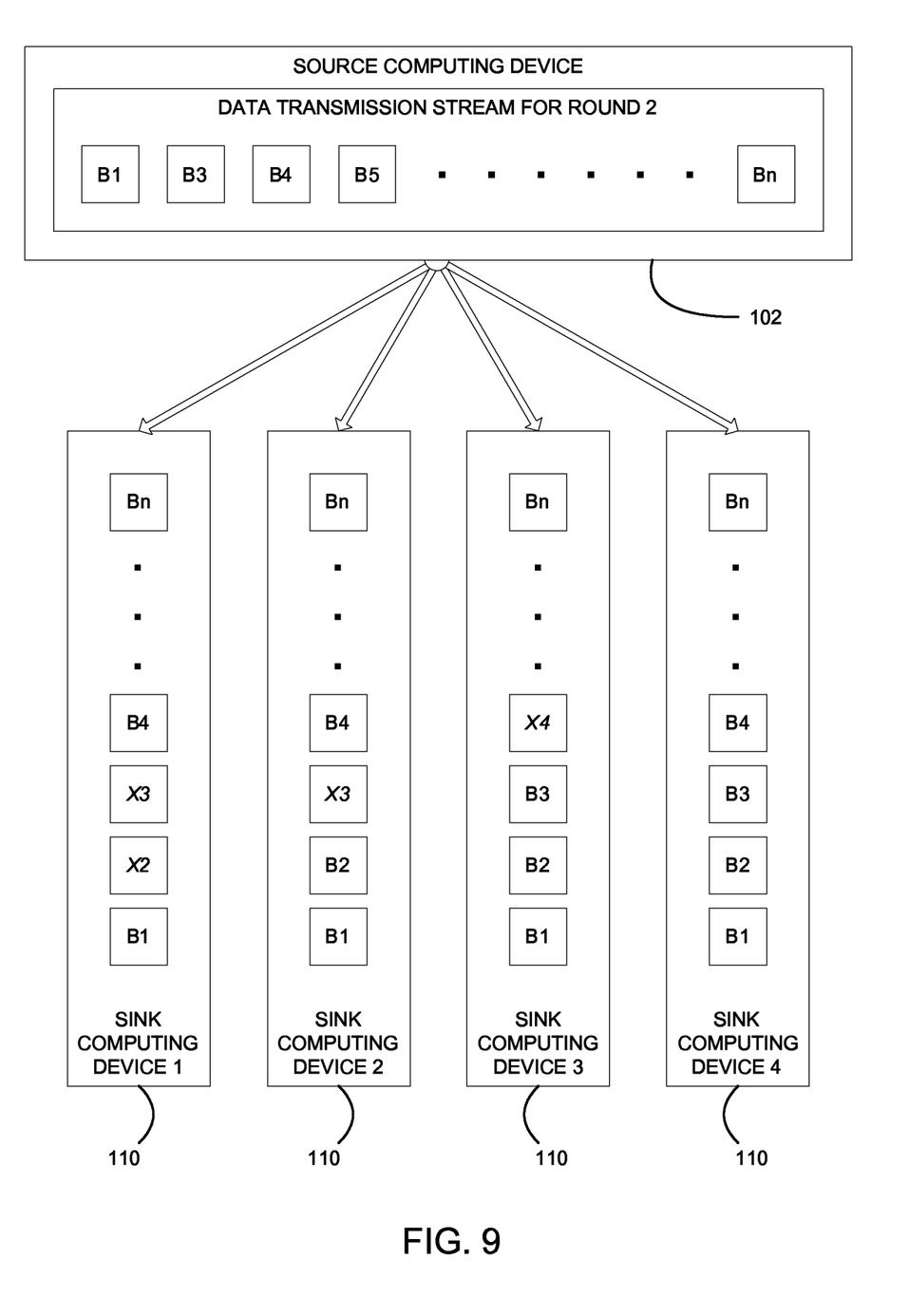
FIG. 9 is a simplified diagram illustrating a second round of data transmission to the plurality of computing devices during the method of FIG. 5.

Referring now to FIG. 7-9, an illustrative first and second round of data transmissions from the source computing device 102 to four sink computing devices 110 is shown. In FIG. 7, the source computing device 102 transmits a data file to the sink computing device 110 embodied as a plurality of data blocks, B1 to Bn. During the first round of data transmissions, the first sink computing device 110 received data blocks B1 and B2, but did not receive or received in a corrupted state data blocks B3, B4, and B5. These blocks are illustrated in FIG. 7 as data blocks X3, X4, and X5, respectively, to indicate that they are lost data blocks for the first sink computing device 110. The second sink computing device 110 received data blocks B1, B2, B4, and B5 but data block B3 was lost. The third sink computing device 110 received data blocks B2, B3, and B5 but data blocks B1 and B4 were lost. Additionally, the fourth sink computing device 110 received all of the data blocks for the first round of data transmissions.

The respective bucket lists for each of the sink computing devices 110 after the first round of data transmissions are illustrated in FIG. 8. The bucket list 801 of the first computing device 110 includes indicia or the identification of data blocks B3 (X3), B4 (X4), B5 (X5), and any additional data blocks, Xn, that the first computing device 110 determined were lost during the first round of data transmissions. Similarly, the bucket list 802 of the second computing device includes indicia or the identification of the data block B3 and any additional data blocks determined to be lost by the sink second computing device 110. The bucket list 803 of the third sink computing device 110 includes indicia or the identification of the data blocks B1 and B4 and any additional data blocks determined to be lost by the third computing device 110. The bucket list 804 of the fourth computing device 110 is empty. Each computing device 110 having a non-empty bucket list transmits its respective bucket list to the source computing device 102 based one or more criteria as discussed above (e.g., upon receiving the end-of-round notification, a default delay, value, the size of the bucket list, etc.).

Subsequently, as illustrated in FIG. 9, the source computing device 102 aggregates the bucket lists received from the computing devices 110 and initiates a second round of data transmissions. The second round of data transmissions is based on the aggregated bucket lists. For example, in the illustrative embodiment, the source computing device 102 retransmits data blocks B1, B3, B4, B5, and so on. As such, the source computing device 102 only retransmits those data blocks identified as being lost by one or more of the reporting sink computing devices 110. The retransmitted data blocks are received by the sink computing devices 110, which update their respective bucket lists based on receiving or not receiving particular data blocks. The source computing device 102 may conduct successive rounds of data transmission until each sink computing device 110 has a full set of valid data blocks indicating that the data file has been successfully transmitted to each of the sink computing devices 110.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected. For example, it should be appreciated that although the system 100 has been generally described above for use with "one-to-many" data communications, the system, devices, and methods described above are equally applicable to "one-to-one data" communications. In such embodiments, the computing device group 104 may include a single sink computing device 110, which receives "one-to-one" data communications from the source computing device 102 using the methods and devices described herein.

The invention claimed is:

1. A method, to be employed by a source computing device, comprising:
    initializing a data transmission session;
    transmitting, to a plurality of sink computing devices, a plurality of data packets during the data transmission session;
    transmitting, to the plurality of sink computing device, a message associated with an end of transmitting the plurality of data packets during the data transmission session;
    receiving, from a first sink computing device of the plurality of sink computing devices at a first time slot and during the data transmission session, a first list of lost data block if there is data packet(s) from the plurality of data packets that the first sink computing device doesn't receive from the source computing device, wherein the lost data blocks are included in the data packets of the plurality of data packets not received from the source computing device; and
    receiving, from a second sink computing device of the plurality of sink computing device different from the first sink computing device and at a second time slot and during the data transmission session, a second list of lost data block if there is data packet(s) from the plurality of data packets that the second sink computing device doesn't receive from the source computing device,
    wherein the first time slot is prior to the second time slot if the first sink computing device has a higher priority than the second sink computing device,
    wherein at least one of the first list of lost data block and the second list of lost data block is to be received from the first sink computing device and/or the second sink computing device in response to the message transmitted during the data transmission session.

2. The method of claim 1, further comprising:
    retransmitting, to the first sink computing device, the data packet(s) indicated in the first list of lost data block;
    transmitting, to the first sink computing device, another message associated with an end of retransmitting the data packet(s);
    receiving, from the first sink computing device and in response to the another message, a third list of lost data block if there is data packet(s) from the retransmitted data packet(s) that the first sink computing device doesn't received from the source computing device; and
    repeating the above steps until there is no data packet from the retransmitted data packet(s) that the first sink computing device doesn't receive from the source computing device.

3. The method of claim 1, further comprising:
    retransmitting, to the second sink computing device, the data packet(s) indicated in the second list of lost data block;
    transmitting, to the second sink computing device, another message associated with an end of notification after retransmitting the data packet(s);
    receiving, from the second sink computing device and in response to the another message, a fourth list of lost data block if there is data packet(s) from the retransmitted data packet(s) that the second sink computing device doesn't receive from the source computing device; and
    repeating the above steps until there is no data packet from the retransmitted data packet(s) that the second sink computing device doesn't receive from the source computing device.

4. The method of claim 1, wherein the data packet(s) indicated in the first list of lost data block is to be more than the data packet(s) indicated in the second list of lost data block, if the first sink computing device has the higher priority than the second sink computing device.

5. The method of claim 1, wherein the first time slot is to happen after expiration of a first delay value associated with a status of a wireless local access networks (WLAN) channel between the source computing device and the first sink computing device.

6. The method of claim 1, wherein the second time slot is to happen after expiration of a second delay value associated with a status of a wireless local access networks (WLAN) channel between the source computing device and the second sink computing device.

7. A method, to be employed by a sink computing device from a plurality of sink computing devices, comprising:
    receiving, from a source computing device, at least one of a plurality of data packets during a data transmission session;
    receiving, from the source computing device and during the data transmission session, a message indicating an end of transmitting the plurality data packets from the source computing device to the sink computing device, wherein receiving the message comprises receiving the message after transmission of the plurality of data packets is complete;

transmitting, to the source computing device at a first time slot and in response to the message and during the data transmission session, a first list of lost data blocks if there is data packet(s) from the plurality of data packets that the sink computing device doesn't receive from the source computing device, wherein each of the lost data blocks listed in the first list of lost data blocks is sent by the source computing device as part of sending the plurality of data packets;

wherein the first time slot is prior to a second time slot at which another sink computing device of the plurality of sink computing device, different from the sink computing device, is to transmit a second list of lost data block if there is data packet(s) from the plurality of data packets that the another sink computing device doesn't receive from the source computing device, and if the first sink computing device has a higher priority than the second sink computing device.

8. The method of claim 7, wherein the data packet(s) indicated in the first list of lost data block is to be more than the data packet(s) indicated in the second list of lost data block, if the sink computing device has the higher priority than the another sink computing device.

9. The method of claim 7, further comprising:
receiving, from the source sink computing device, another message associated with an end of retransmitting the data packet(s) indicated in the first list of lost data block;
transmitting, to the source computing device and in response to the another message, a third list of lost data block if there is data packet(s) from the retransmitted data packet(s) that the sink computing device doesn't receive from the source computing device; and
repeating the above steps until there is no data packet from the retransmitted data packet(s) that the sink computing device doesn't receive from the source computing device.

10. The method of claim 7, wherein the first time slot is to happen after expiration of a first delay value associated with a status of a wireless local access networks (WLAN) channel between the source computing device and the sink computing device.

11. The method of claim 7, wherein the second time slot is to happen after expiration of a second delay value associated with a status of a wireless local access networks (WLAN) channel between the source computing device and the another sink computing device.

12. A source computing device, comprising:
one or more processors; and
a memory device having stored therein a plurality of instructions that, if executed by the processors, cause the processors to:
initialize a data transmission session;
transmit, to a plurality of sink computing devices, a plurality of data packets during the data transmission session;
transmit, to the plurality of sink computing devices, a message associated with an end of transmitting the plurality of data packets during the data transmission session;
receive, from a first sink computing device of the plurality of sink computing devices at a first time slot and during the data transmission session, a first list of lost data block if there is data packet(s) from the plurality of data packets that the first sink computing device doesn't receive from the source computing device, wherein the lost data blocks are included in the data packets of the plurality of data packets not received from the source computing device; and
receive, from a second sink computing device of the plurality of sink computing device different from the first sink computing device and at a second time slot and during the data transmission session, a second list of lost data block if there is data packet(s) from the plurality of data packets that the second sink computing device doesn't receive from the source computing device, wherein, the first time slot is prior to the second time slot if the first sink computing device has a higher priority than the second sink computing device, wherein at least one of the first list of lost data block and the second list of lost data block is to be received from the first sink computing device and/or the second sink computing device in response to the message.

13. The source computing device of claim 12, wherein the plurality of instructions further cause the processors to:
retransmit, to the first sink computing device, the data packet(s) indicated in the first list of lost data block;
transmit, to the first sink computing device, another message associated with an end of retransmitting the data packet(s);
receive, from the first sink computing device and in response to the another message, a third list of lost data block if there is data packet(s) from the retransmitted data packet(s) that the first sink computing device doesn't received from the source computing device; and
repeat the above steps until there is no data packet from the retransmitted data packet(s) that the first sink computing device doesn't receive from the source computing device.

14. The source computing device of claim 12, wherein the plurality of instructions further cause the processors to:
retransmit, to the second sink computing device, the data packet(s) indicated in the second list of lost data block;
transmit, to the second sink computing device, another message associated with an end of notification after retransmitting the data packet(s);
receive, from the second sink computing device and in response to the another message, a fourth list of lost data block if there is data packet(s) from the retransmitted data packet(s) that the second sink computing device doesn't receive from the source computing device; and
repeat the above steps until there is no data packet from the retransmitted data packet(s) that the second sink computing device doesn't receive from the source computing device.

15. The source computing device of claim 12, wherein the data packet(s) indicated in the first list of lost data block is to be more than the data packet(s) indicated in the second list of lost data block, if the first sink computing device has the higher priority than the second sink computing device.

16. The source computing device of claim 12, wherein the first time slot is to happen after expiration of a first delay value associated with a status of a wireless local access networks (WLAN) channel between the source computing device and the first sink computing device.

17. The source computing device of claim 12, wherein the second time slot is to happen after expiration of a second delay value associated with a status of a wireless local access networks (WLAN) channel between the source computing device and the second sink computing device.

18. A sink computing device, comprising:
one or more processors; and
a memory device having stored therein a plurality of instructions that, if executed by the processors, cause the processors to:
receive, from a source computing device, at least one of a plurality of data packets during a data transmission session;
receive, from the source computing device and during the data transmission, a message associated with an end of transmitting the plurality data packets from the source computing device to the sink computing device, wherein receiving the message comprises receiving the message after transmission of the plurality of data packets is complete;
transmit, to the source computing device at a first time slot and in response to the message and during the data transmission session, a first list of lost data block if there is data packet(s) from the plurality of data packets that the sink computing device doesn't receive from the source computing device, wherein each of the lost data blocks listed in the first list of lost data blocks is sent by the source computing device as part of sending the plurality of data packets;
wherein the first time slot is prior to a second time slot at which another sink computing device of the plurality of sink computing device, different from the sink computing device, is to transmit a second list of lost data block if there is data packet(s) from the plurality of data packets that the another sink computing device doesn't receive from the source computing device, and if the first sink computing device has a higher priority than the second sink computing device.

19. The sink computing device of claim 18, wherein the data packet(s) indicated in the first list of lost data block is to be more than the data packet(s) indicated in the second list of lost data block, if the sink computing device has the higher priority than the another sink computing device.

20. The sink computing device of claim 18, wherein the plurality of instructions further cause the processors to:
receive, from the source sink computing device, another message associated with an end of retransmitting the data packet(s) indicated in the first list of lost data block;
transmit, to the source computing device and in response to the another message, a third list of lost data block if there is data packet(s) from the retransmitted data packet(s) that the sink computing device doesn't receive from the source computing device; and
repeat the above steps until there is no data packet from the retransmitted data packet(s) that the sink computing device doesn't receive from the source computing device.

21. The sink computing device of claim 18, wherein the first time slot is to happen after expiration of a first delay value associated with a status of a wireless local access networks (WLAN) channel between the source computing device and the sink computing device.

22. The sink computing device of claim 18, wherein the second time slot is to happen after expiration of a second delay value associated with a status of a wireless local access networks (WLAN) channel between the source computing device and the another sink computing device.

* * * * *